E. H. WINGQVIST.
METHOD OF CUTTING BEVEL GEAR WHEELS.
APPLICATION FILED NOV. 30, 1915.
1,281,735.
Patented Oct. 15, 1918.
3 SHEETS—SHEET 1.
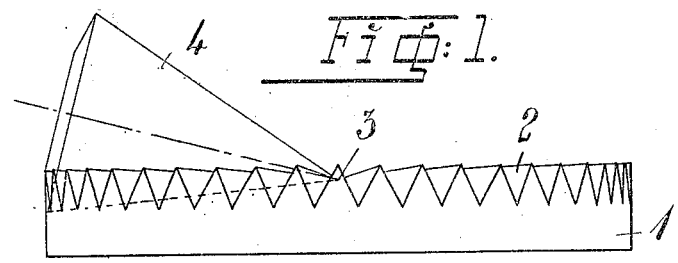
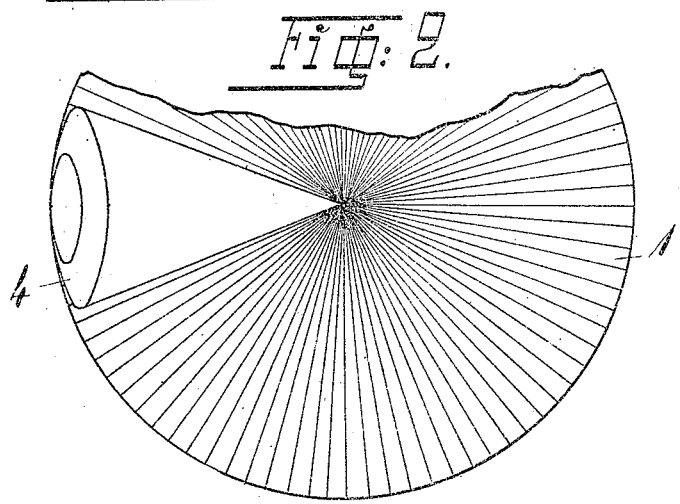
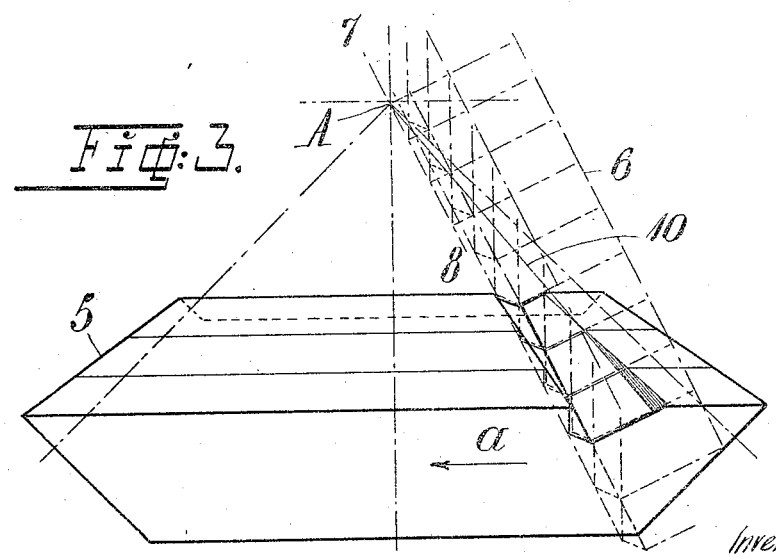
Inventor:
Erik Hjalmar Wingqvist

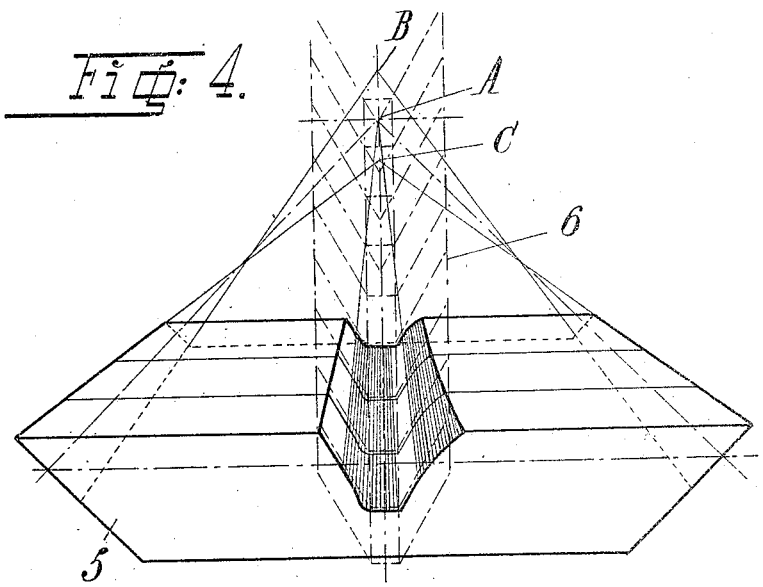
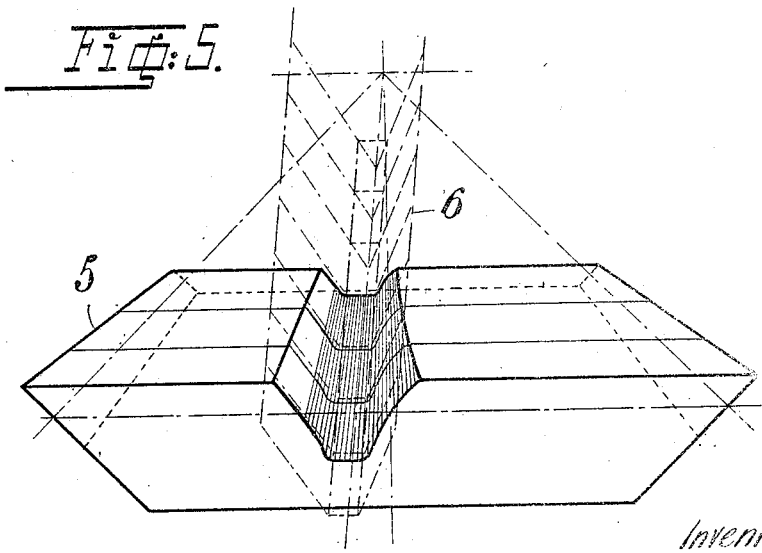

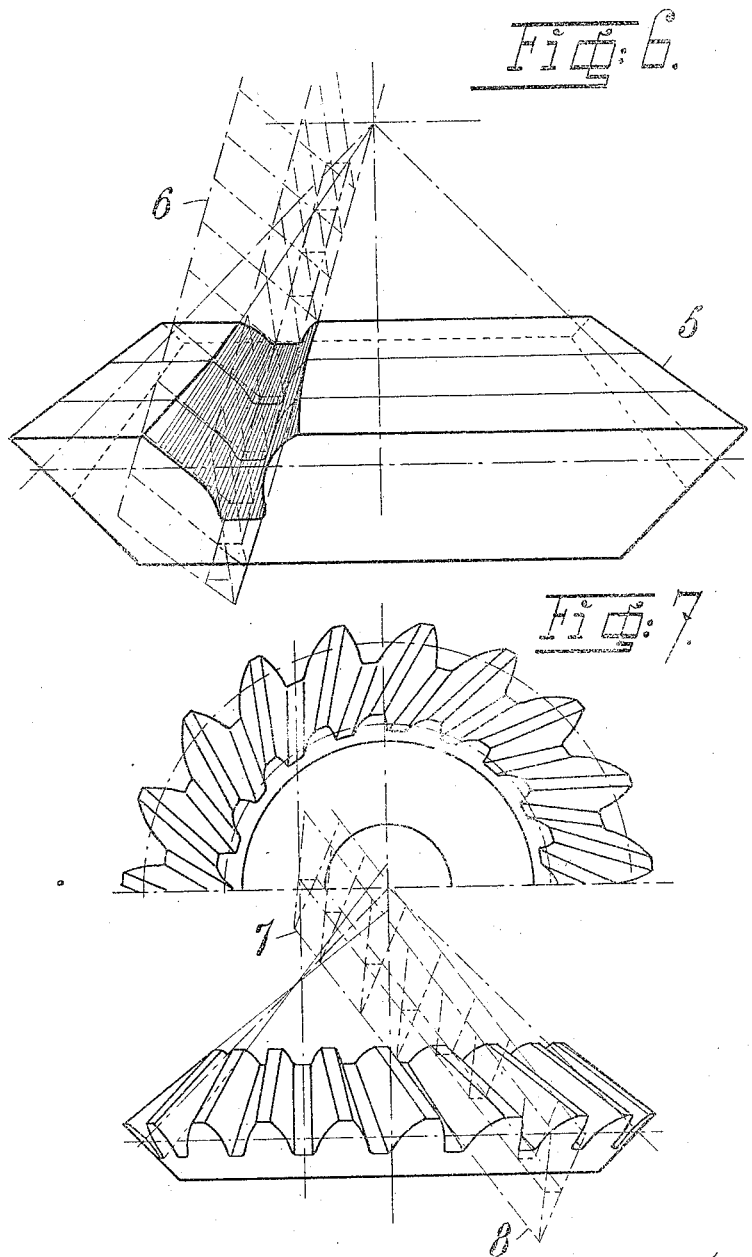

UNITED STATES PATENT OFFICE.

ERIK HJALMAR WINGQVIST, OF GOTTENBORG, SWEDEN, ASSIGNOR TO AKTIEBOLAGET SVENSKA KULLAGERFABRIKEN, OF GOTTENBORG, SWEDEN, A CORPORATION OF SWEDEN.

METHOD OF CUTTING BEVEL GEAR-WHEELS.

1,281,735.   Specification of Letters Patent.   Patented Oct. 15, 1918.

Original application filed March 17, 1915, Serial No. 14,904. Divided and this application filed November 30, 1915. Serial No. 64,262.

*To all whom it may concern:*

Be it known that I, ERIK HJALMAR WINGQVIST, a citizen of the Kingdom of Sweden, residing at Gottenborg, Sweden, have invented new and useful Improved Methods of Cutting Bevel Gear-Wheels, of which the following is a specification.

This invention relates to an improved method of cutting bevel gear-wheels being a division of my copending patent application Serial Number 14904 filed March 17, 1915.

As stated in said patent application a bevel gear-wheel is so formed that the bottom surfaces of the gaps between adjacent teeth lie on or approximately on the surface of a cone or other convergent pyramidal surface whose apex is situated beyond (measured from the gear-wheel) the apex of the normal pitch-cone, and the side surfaces of the teeth are formed on substantially customary theoretically correct lines convergent upon the apex of the normal pitch-cone. By this apparently insignificant modification it is possible, as will be described below, to cut simultaneously both sides of a gap between adjacent teeth by means of a single tool in one and the same working operation. Thus the manufacture of bevel gear-wheels is rendered as simple and may be effected as readily as the manufacture of ordinary spur-wheels.

Preferably in a bevel gear-wheel of this kind the bottom surface of a gap aforesaid is of uniform width throughout its length.

According to the present invention each gap between a pair of adjacent teeth of a bevel gear-wheel of the type described above is formed by traversing over a blank, during the cutting operation, an elongated tool having two cutting surfaces separated by a third cutting surface, which is of uniform width throughout its length and is situated near to the line upon which the first two surfaces produced converge. The said tool is employed in such a manner that during the cutting operation both sides of the gap between the teeth are simultaneously cut, while the tool performs simultaneously a cutting movement in relation to the gear-wheel blank, always maintaining such a position relatively to the said blank that the supposed top line of the said tool passes through the apex of the pitch-cone or touches a sphere, the center of which is situated in the said apex.

The invention will be more clearly understood from the following description read in conjunction with the accompanying diagrammatic drawings, in which:—

Figures 1 and 2 illustrates a pitch-cone and generating wheel in elevation and plan respectively for the purpose of explaining the principles underlying the usual formation of bevel gear-wheels;

Figs. 3 to 5 diagrammatically illustrate various phases of construction of radial toothed bevel gear-wheels according to the present invention; and Figs. 6 and 7 illustrate the formation of skew-toothed bevel gear-wheels also made according to the present invention.

Figs. 1 and 2 illustrate a so-called generating wheel 1 supposed to be made of hard material and a cone 4 supposed to be made of plastic material. The generating wheel 1 is provided with teeth 2 in the form of three-sided pyramids, the tops of which converge in a point 3 on the axis of the generating wheel. The cone 4 may be supposed to form a gear-wheel blank having its apex coincident with the point to which the teeth of the generating wheel converge. If the cone, while kept pressed against the generating wheel 1, is set in rolling motion around the same, the teeth 2 will generate impressions in the cone. The shape of these impressions corresponds to the shape of the teeth 2, except that the side surfaces become curved. The contact between a tooth 2 and the cone 4 during the rolling movement of the latter always takes place along a line through the point 3, and the side surfaces of the teeth lie on a series of straight radial lines all of which pass through the point 3.

If the tops of the teeth of the generating wheel are cut along a conical surface, the top of which lies in the point 3, and if the bottom surfaces of the gaps between the teeth constitute portions of the side-surface of another conical surface, the top of which also lies in the point 3, teeth of hitherto used shape will be generated on the cone 4 during its rolling movement on the generating wheel, *i. e.* the limiting surfaces of all gaps as well as the top surfaces of the teeth converge, if extended, in one and the same point. The tooth walls or surfaces generated by such a generating wheel will also lie on a series of straight radial lines converging on a point such as 3 in the manner mentioned above. It will, however, be easily understood that the tops of the teeth of the generating wheel may also be cut in any other manner without interfering with the above described formation of the side surfaces of the teeth generated. Thus the teeth 2 may for instance be cut along a surface cutting the flanks of the teeth along lines parallel to the top lines of the teeth and consequently, parallel to each other. That is to say, the tops of the teeth may be flattened as if they had been shaved off evenly along their entire length.

In the practical manufacture of gear-wheels according to the present invention, the generating wheel may be substituted by an elongated cutting tool extending over the full length of the tooth and conveniently of the shape corresponding to that of a tooth of the generating wheel formed in cross-section in the above last mentioned manner viz, as a triangle whose apex has been cut away to provide a flattened top edge surface. This cutting tool and a gear-wheel blank are then caused to move in relation to each other in the same manner as a tooth of the generating wheel and the cone 4, at the same time causing the cutting tool to make a cutting movement. This is illustrated in Figs. 3 to 6 of the drawing in which 5 designates a gear-wheel blank and 6 a tool shown diagrammatically. The latter may be composed of or form a series of cutting edges arranged one behind another, and its fundamental form constitutes a truncated wedge having plane side surfaces and a plane parallel-sided surface near to the apex of the wedge. The two side surfaces will intersect each other, if extended, along the line 7—8 corresponding to the top or apex line of a tooth 2 of the generating wheel 1 (Figs. 1 and 2). In order that the tool 6 during its cutting movement shall produce theoretically accurate flanks or side surfaces on the teeth, it is necessary, as will be easily evident from the above discussion concerning Figs. 1 and 2, that the tool always maintains such a position in relation to the gear-wheel blank, that the supposed line 7—8 always passes through the apex A of the pitch-cone of the gear-wheel blank and that the tool, in addition, moves relatively to the gear-wheel blank in the same manner as a tooth of the generating wheel 1 moves in relation to the cone 4.

According to Fig. 3, in which the direction of movement of the gear-wheel blank and of the tool (apart from the cutting movement of the latter) is indicated by the arrow $a$, the tool has cut into the gear-wheel blank so far, that it has commenced to form one side (in the figure the right side) of the gap between two teeth. The surface so formed is shown in full lines and is so formed as to lie on a series of straight lines such as the line 10. This line which, as will the other straight lines of the series, indicates a temporary contact line between the tool and the gear-wheel blank, passes, if extended, as will be evident from the foregoing description, through the point A. In Fig. 4 the tool has reached a middle position relatively to the gear-wheel blank. The tool has now, by means of its right side according to the illustration, formed the right wall of the gap to such an extent, as is requisite for its engagement with a tooth of a coöperating gear-wheel. The bottom of the gap, which in this case will be exactly or substantially of the same width throughout, is also finished, and the left edge of the tool has, to the left side of the bottom of the gap, cut a comparatively sharply defined angular portion, which will form a part of the left side of the finished gap, but which does not actually constitute a part of the working surface of the tooth and the shape of which, consequently, is of no importance. A corresponding sharp angular cut will also be made on the right of the bottom of the gap, as the tool and the gear-wheel blank continue their movement from the middle position shown in Fig. 4 during the formation of the left side of the gap. Two different stages of this forming operation are shown in Figs. 5 and 6.

As is evident from the above, it is possible, by means of a single tool and in the same working operation, to form both sides of the gap between two adjacent teeth, the gap having its sides formed on correct theoretical lines and the bottom located on a conical or pyramidal surface, the top B of which, Fig. 4, lies above the apex of the pitch-cone, reckoning from the gear-wheel. In order that two gear-wheels of the shape in question shall be able to coöperate, it is necessary to form the upper surfaces of the teeth on different lines to those hitherto employed, so as to accommodate them to the different angle of slope of the bottoms of the gaps just described. Thus the tops will be cut along a conical surface, the top C of which, Fig. 4, is situated nearer to the gear-wheel than the top of the pitch-cone.

By such a formation of the teeth an important advantage is, however, attained, because the engagement of the teeth of two coacting gear-wheels commences at the outer ends of the teeth and continues along longer and longer lines, until it extends finally along the whole length of the teeth. On account thereof the engagement of the teeth will be gradual, and the running of the gear will be noiseless and smooth.

Of course, the invention is also applicable to bevel gear-wheels in which the teeth are inclined relatively to radial planes through the axis of the gear-wheel, i. e., skew or non-radial teeth. Such a wheel is shown in Fig. 7 in side view and plan. Also in this case each gap may be cut in a single working operation by means of the tool described above. In this case, however, the imaginary apex-line 7—8 of the tool has to touch a sphere, the center of which coincides with the top of the pitch-cone of the gear-wheel blank.

Having now described my invention, what I claim as new and desire to secure by Letters Patent is:—

1. A method of cutting bevel gear-wheels, consisting in forming the space between each pair of adjacent teeth by means of an elongated tool having a series of cutting edges placed one behind another, said tool being formed as a truncated wedge having straight side surfaces and a plane top surface of the same width throughout, causing said tool to perform simultaneously a rolling and a cutting movement in relation to the gear-wheel blank, and causing the tool to maintain always such a position relatively to said blank, that the supposed top or apex line of the tool touches a sphere having its center in the top of the pitch-cone and the radius of which may attain the limit value=0.

2. A method of cutting bevel gear-wheels, consisting in forming the space between each pair of adjacent teeth by means of an elongated tool having a series of cutting edges placed one behind another, said tool being formed as a truncated wedge having straight side surfaces and a plane top surface of the same width throughout, causing said tool to perform simultaneously a rolling and a cutting movement in relation to the gear-wheel blank, causing the tool to traverse the blank once in cutting each said space and forming the adjacent side surfaces of the said teeth, and causing the tool to maintain always such a position relatively to said blank, that the supposed top or apex line of the tool touches a sphere having its center in the top of the pitch-cone and the radius of which may attain the limit value=0.

3. A method of cutting bevel gear wheels, consisting in forming the space between each pair of adjacent teeth by means of a cutting tool formed as a truncated wedge having straight side surfaces and a plane top surface, causing said tool to perform simultaneously a rolling and a cutting movement in relation to the gear wheel blank, and causing the tool to maintain always such a position relatively to said blank, that the supposed top or apex line of the tool touches a sphere having its center in the top of the pitch cone and the radius of which may attain the limit value=0, whereby the bottoms of the spaces coincide with a cone intersecting the normal pitch cone and having its apex farther removed from the gear.

In testimony whereof I have hereunto set my hand in presence of two subscribing witnesses.

ERIK HJALMAR WINGQVIST.

Witnesses:
 THUN S. FQUIST,
 KARL RUNCSKOG.